US008527516B1

(12) United States Patent
Spasojevic et al.

(10) Patent No.: US 8,527,516 B1
(45) Date of Patent: Sep. 3, 2013

(54) IDENTIFYING SIMILAR DIGITAL TEXT VOLUMES

(75) Inventors: Nemanja L. Spasojevic, San Francisco, CA (US); Guillaume Poncin, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/404,943

(22) Filed: Feb. 24, 2012

Related U.S. Application Data

(60) Provisional application No. 61/446,925, filed on Feb. 25, 2011.

(51) Int. Cl.
*G06F 17/30* (2006.01)

(52) U.S. Cl.
USPC .......................................... 707/738; 707/749

(58) Field of Classification Search
None
See application file for complete search history.

(56) References Cited

U.S. PATENT DOCUMENTS

| 6,658,423 | B1* | 12/2003 | Pugh et al. ............................ 1/1 |
| 6,757,675 | B2* | 6/2004 | Aiken et al. ........................ 1/1 |
| 6,990,628 | B1* | 1/2006 | Palmer et al. ................. 715/234 |
| 2006/0095521 | A1* | 5/2006 | Patinkin ........................ 709/206 |
| 2008/0010292 | A1* | 1/2008 | Poola ............................. 707/10 |
| 2008/0144055 | A1* | 6/2008 | Sussmeier et al. ............. 358/1.9 |
| 2009/0265363 | A1* | 10/2009 | Lai et al. ........................ 707/100 |
| 2010/0082709 | A1* | 4/2010 | Yamamoto ..................... 707/812 |
| 2011/0029525 | A1* | 2/2011 | Knight ........................... 707/737 |
| 2012/0093421 | A1* | 4/2012 | Kletter .......................... 382/209 |
| 2012/0105918 | A1* | 5/2012 | Fan et al. ....................... 358/462 |

FOREIGN PATENT DOCUMENTS

WO  WO 2010087566 A1 *  8/2010

OTHER PUBLICATIONS

Baluja, S., et al., "Content Fingerprinting Using Wavelets," Google, Inc., vol. 3, pp. 198-207, Nov. 2006.
Baluja, S., et al., "Permutation Grouping: Intelligent Hash Function Design for Audio & Image Retrieval," Google, Inc., ICASSP, pp. 2137-2140, 2008.
Broder, A. Z., et al., "Min-Wise Independent Permutations," Journal of Computer and Systems Sciences, vol. 60, pp. 630-659, 2000.
Chum, O., et al., "Near Duplicate Image Detection min-Hash and tf-idf Weighting," in *Proceedings of the British Machine Vision Conference*, Leeds, United Kingdom, 10 pages, Sep. 2008.
Dean, J., et al., "MapReduce: Simplified Data Processing on Large Clusters," in *Communications of the ACM*, vol. 51, No. 1, pp. 107-113, 2008.
Indyk, P., et al., "Approximate Nearest Neighbors: Towards Removing the Curse of Dimensionality," in *STOC '98: Proceedings of the Thirtieth Annual ACM Symposium on Theory of Computing*, New York, NY, USA, pp. 604-613, 1998.

(Continued)

*Primary Examiner* — Tony Mahmoudi
*Assistant Examiner* — Umar Mian
(74) *Attorney, Agent, or Firm* — Fenwick & West LLP

(57) ABSTRACT

Relationships between digital text volumes in a corpus are identified by comparing a plurality of digital text volumes in the corpus to identify clusters of similar volumes. For a given cluster, the pages of pairs of volumes within the cluster are compared to determine page similarity data, the page similarity data indicating degrees of similarity between the compared pages. The relationships between pairs of volumes in the clusters are classified based on the similarity data.

20 Claims, 4 Drawing Sheets

(56) References Cited

OTHER PUBLICATIONS

Radev, D. R., "A Common Theory of Information Fusion from Multiple Text Sources Step One: Cross-Document Structure," in *Proceedings of the 1st SIGdial Workshop on Discourse and Dialogue*, Morristown, NJ, USA, pp. 604-613, 1998.

Taycher, L., "Books of the world, stand up and be counted! All 129,864,880 of you.," Google, Inc., Aug. 5, 2010, 3 pages, [online] [retrieved Jul. 12, 2012] Retrieved from the internet <http://booksearch.blogspot.com/2010/08/books-of-world-stand-up-and-be-counted.html>.

\* cited by examiner

IDENTIFYING SIMILAR DIGITAL TEXT VOLUMES

CROSS-REFERENCE TO RELATED APPLICATIONS

This application claims the benefit of U.S. Provisional Patent Application No. 61/446,925, entitled "Identifying Similar Digital Text Volumes," filed on Feb. 25, 2011, which is hereby incorporated by reference in its entirety.

BACKGROUND

1. Field of Disclosure

The disclosure generally relates to the field of digitizing books, and in particular to identifying and classifying related volumes in a corpus.

2. Background Information

A digital text corpus may be created by scanning books and other texts from libraries and other repositories. The collections held by different repositories often have significant content overlap. As a result, the digital text corpus has multiple copies of similar (including identical) volumes. Identifying similar volumes in the corpus is useful for purposes such as selecting a representative version of the volume, pages, or even text thereof, as well as catching anomalous volumes, detecting different but related volumes that share content, and detecting piracy.

However, for a large corpus, it is difficult to compare the digital text volumes to each other. It is infeasible to compare every pair of volumes in the corpus, and even more computationally prohibitive to compare every pair of pages within the volumes. Therefore, it is hard to identify similar volumes within the corpus.

SUMMARY

The above and other issues are addressed by a computer-implemented method, non-transitory computer readable storage medium, and computer system for identifying relationships between digital text volumes in a corpus. An embodiment of the method comprises comparing a plurality of digital text volumes in the corpus to identify a cluster of similar volumes. The method also comprises comparing pages of a pair of volumes within the cluster to determine page similarity data indicating degrees of similarity between the compared pages and classifying a relationship between the pair of volumes based on the page similarity data.

An embodiment of the computer system for identifying relationships between digital text volumes in a corpus comprises a non-transitory computer-readable storage medium storing executable computer program instructions, the computer program instructions comprising instructions for comparing a plurality of digital text volumes in the corpus to identify a cluster of similar volumes. The instructions also comprise instructions for comparing pages of a pair of volumes within the cluster to determine page similarity data indicating degrees of similarity between the compared pages and classifying a relationship between the pair of volumes based on the page similarity data. The computer system further comprises a processor for executing the computer program instructions.

An embodiment of the non-transitory computer-readable storage medium stores executable computer program instructions for comparing a plurality of digital text volumes in the corpus to identify a cluster of similar volumes, the instructions executable to perform steps comprising comparing a plurality of digital text volumes in the corpus to identify a cluster of similar volumes. The steps also comprise comparing pages of a pair of volumes within the cluster to determine page similarity data indicating degrees of similarity between the compared pages and classifying a relationship between the pair of volumes based on the page similarity.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

Figure 1:
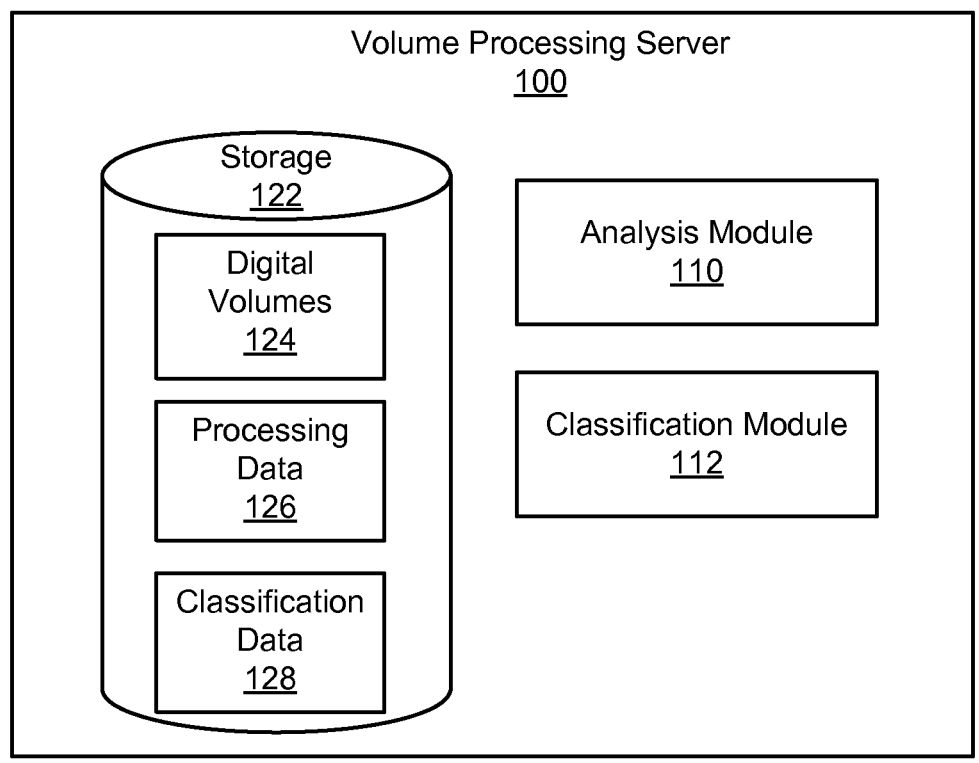
FIG. 1 is a high-level block diagram of a volume processing server for identifying and classifying similar volumes of digital text in a corpus, according to one embodiment.

FIG. 1 is a high-level block diagram of a volume processing server 100 for identifying and classifying similar volumes of digital text in a corpus, according to one embodiment. The server 100 includes an analysis module 110, a classification module 112, and a storage module 122. Only one server 100, analysis module 110, classification module 112, and storage module 122 are shown in FIG. 1 in order to simplify and clarify the description. Various embodiments have multiple instances of these entities. Moreover, the entities can be distributed across multiple machines connected by a network. For example, the volume processing server 100 may be implemented by a distributed processing system. Other embodiments of the server 100 include different and/or additional modules. In addition, the functions may be distributed among the modules in a different manner than described herein.

The storage module 122 stores data associated with digital text volumes 124. A digital text volume 124 (or simply a "volume") is a digital representation of a book in which the text is in a machine-readable format. A volume may contain images in addition to the text. As used herein, the term "book" refers to a collection of text, such as traditional printed physical book, magazine, or newspaper. The collection of digital volumes 124, in turn, forms a digital corpus. The corpus may be formed of volumes from one or more libraries.

In one embodiment, the data stored by the storage module 122 include digital text volumes 124, processing data 126, and classification data 128. A digital text volume 124 is typically produced by scanning the pages of a book or other document to obtain digital images thereof, performing an optical character recognition (OCR) process on the images, and then storing the text produced by the OCR as the digital text volume. The digital text volume 124 may undergo additional processing to, for example, create metadata describing the digital text volume and the volume's text, which may in turn be used to improve the quality of the text. The digital text volume 124 can be used to prepare an electronic publication (epub) for reading using an electronic reader (eReader) and/or for other purposes. In one example, the storage module 122 stores a very large number of digital volumes 124, in one embodiment over 15 million digital volumes may be stored.

The storage module 122 typically stores many similar digital text volumes 124. For example, the same book can be present in two different repositories and scanned to produce two similar digital text volumes 124. Likewise, different editions of the same book may be scanned to produce similar digital text volumes 124. As such, similar digital text volumes 124 may be identical, or may contain slight differences such as different pagination, minor textual variations, and/or portions of different text. For example, a second edition of a textbook may have different pagination than the first edition, and include an extra chapter. Thus, the two editions considered in their entirety are substantially similar, but when considered page by page, they are substantially different.

The processing data 126 include data describing the digital volumes 124. In one embodiment, these data are generated by the analysis module 110 during processing. The data may include word shingles extracted from the digital text volumes 124, features such as hash values describing both digital text volumes and individual pages of the volumes, and indexes corresponding to the hash values.

The classification data 128 include data describing relationships between digital volumes 124. In one embodiment, the classification data 128 indicate relationships between pairs of the digital volumes 124, such as whether the paired volumes have the same or different pagination, whether one volume contains a contiguous subset of text within the other volume, and whether the two volumes have overlapping text. These classification data 128 may be used to improve indexing within the corpus for many purposes, e.g., improving search functionality and detecting plagiarism/piracy. The generation of processing data 126 and classification data 128 is described in further detail below.

The analysis module 110 analyses the digital text volumes 124 in the corpus to produce processing data 126 describing the volumes. In one embodiment, the analysis module 110 generates sets of features that describe the volumes 124 by applying multiple different hashing functions to the text of the volumes. These hashing functions are applied to both the entire text and the individual pages of a volume. In one embodiment, the analysis module 110 applies these hash functions and selects a minimum value for each set of features per hash function as part of a min-hash schema. The selected hash values are stored in the storage module 122 as processing data 126.

The classification module 112 uses the processing data 126 to classify relationships between volumes 124 within the corpus. In one embodiment, the classification module 112 uses the hash values associated with complete volumes 124 to identify clusters of similar volumes and uses the hash values associated with individual pages to determine relationships between pairs of volumes in the clusters. For example, the classification module 110 can identify pairs of digital text volumes having similar pagination and text as well as pairs of volumes having substantially the same text, but different pagination. The classification module 110 can likewise identify a digital text volume that contains a contiguous subset of text from another volume, and a volume that contains text that overlaps with text in another volume.

Figure 2:
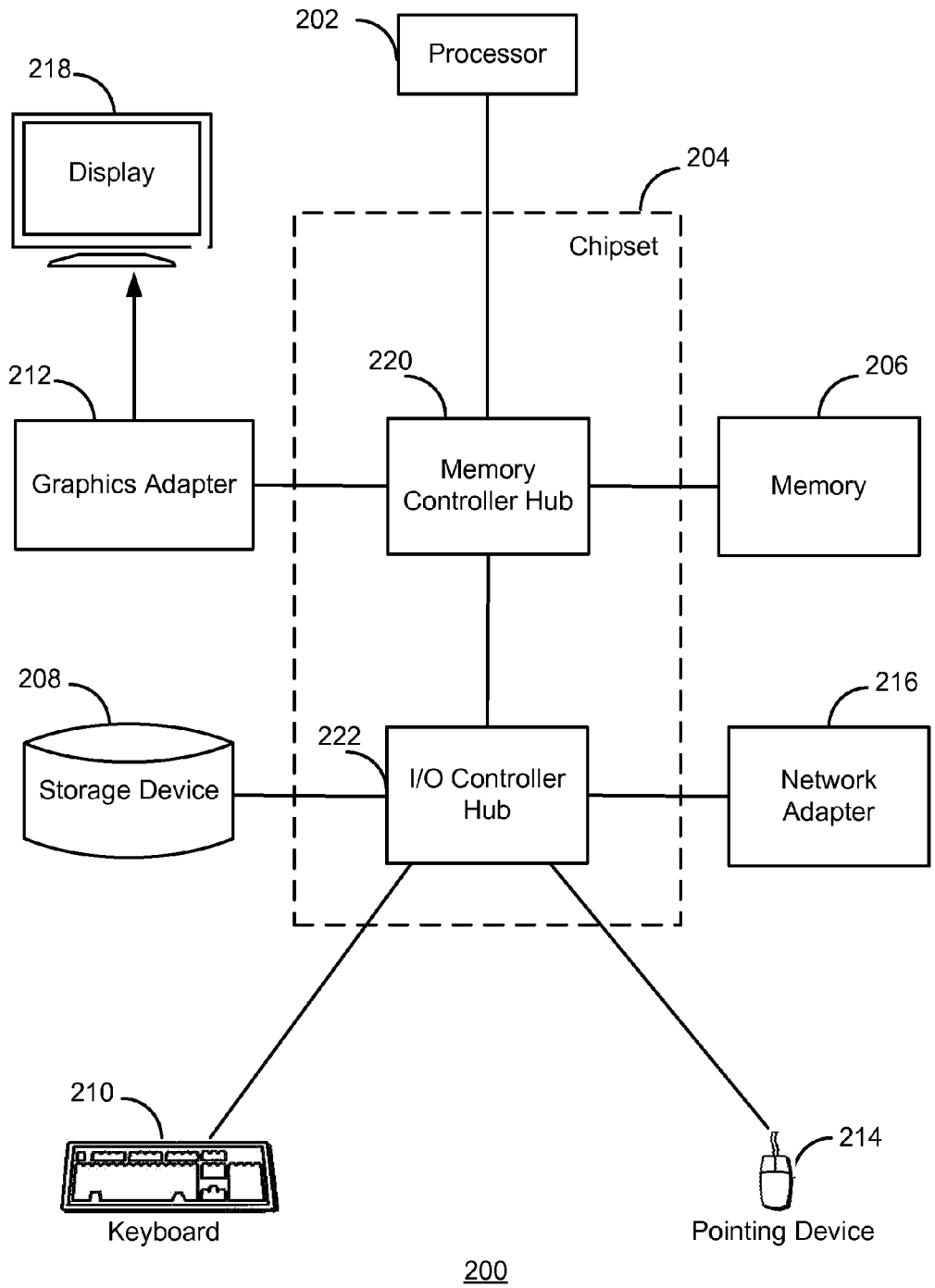
FIG. 2 is a high-level block diagram illustrating an example of a computer for use as the volume processing server shown in FIG. 1, according to one embodiment.

FIG. 2 is a high-level block diagram illustrating an example of a computer 200 for use as a volume processing server 100. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer 200. The graphics adapter 212 displays images and other information on the display device 218. The network adapter 216 couples the computer 200 to a network. Some embodiments of the computer 200 have different and/or other components than those shown in FIG. 2. The types of computer 200 can vary depending upon the embodiment and the desired processing power. The computer 200 may comprise multiple blade servers working together to provide the functionality described herein.

The computer 200 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

Figure 3:
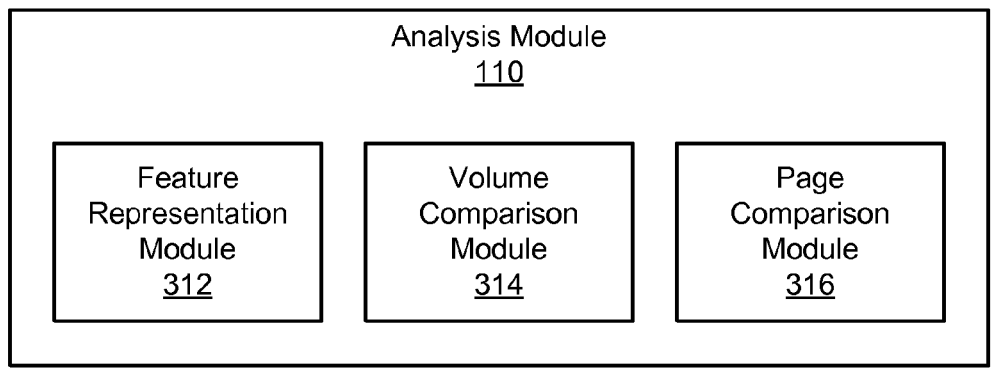
FIG. 3 is a high-level block diagram of an analysis module for analyzing the digital text volumes in the corpus, according to one embodiment.

FIG. 3 is a high-level block diagram of the analysis module 110 for analyzing the digital text volumes 124 in the corpus, according to one embodiment. The analysis module 110 includes a feature representation module 312, a volume comparison module 314, and a page comparison module 316. Other embodiments of the analysis module 110 include different and/or additional modules. In addition, the functions may be distributed among the modules in a different manner than described herein.

The feature representation module 312 analyzes the text of the digital volumes 124 and generates sets of features that enable efficient comparison of the volumes and the volumes' pages. Once generated, these features are stored in the storage module 122 as processing data 126. In one embodiment, the feature representation module 312 represents the text of a volume as a set of 5-word "shingles" for the text. These shingles are overlapping word sequences, comprising contiguous 5-word sequences within the text. For example, if a volume contains the phrase "a quick brown fox jumped over,"

one 5-word shingle from the volume is "a quick brown fox jumped" and a subsequent 5-word shingle is "quick brown fox jumped over." Each shingle is a single feature within the set of features for the volume.

In one embodiment, the feature representation module 312 shingles the text of the volume as a whole, and also shingles the pages of the volume individually. Thus, separate sets of shingles (i.e., sets of features) are created for the volume and the individual pages of the volume. Depending upon the embodiment, the shingling for a page can span to a subsequent page (e.g., one shingle may contain four words from one page and one word from the next page, and the subsequent shingle contains three words from the first page, and two words from the next page), or the shingling can contain only text on a single page (e.g., the last shingle of a page contains only the last word of the page and does not contain any words from the next page).

In order for pairs of digital volumes 124 to be compared more efficiently, an embodiment of the feature representation module 312 performs dimensionality reduction to reduce the high-dimensionality sets of features for the volumes (e.g., the sets of shingles for the individual volumes and the volumes' pages) into lower-dimensionality sets of features. In one embodiment, the feature representation module 312 uses the min-hashing scheme described above to reduce the dimensionality of the feature sets.

In more detail, to reduce the dimensionality of a given high-dimensionality feature set, the min-hashing scheme applies multiple independent hash functions to each individual feature (e.g., shingle) in the set. Each hash function produces a hash value and this process therefore produces multiple hash values for each function—one hash value for each feature in the set. The feature representation module 312 selects the minimum hash value produced by each hash function as that function's min-hash value for the feature set. The set of minimum hash values for the hash functions applied to a feature set form a reduced-dimensionality representation of the feature set.

In one embodiment, the feature representation module 312 uses 100 independent hash functions to perform min-hashing on the feature set of a volume (e.g., the shingles of the volume), and 34 independent hash functions for the feature set of a page of a volume (e.g., the shingles of a page). Accordingly, the reduced-dimensionality feature set for a volume contains 100 min-hash values, and the feature set for each page of the volume contains 34 min-hash values. Other embodiments of the feature representation module 312 use different numbers of hash functions and/or use different features to represent the digital volumes 124.

The volume comparison module 314 compares the digital text volumes 124 in order to identify clusters of similar volumes. These clusters are described by volume similarity data stored as part of the processing data 126. In one embodiment, the volume comparison module 314 indexes the volumes 124 by creating a key for each unique min-hash value produced by applying the hash functions to the volumes' features. In this manner, the volume comparison module 314 associates each min-hash value with one or more digital volumes 124 that have the corresponding min-hash value for the given hash function.

The volume comparison module 314 uses the index to identify similar digital text volumes 124 based on the min-hash values that the volumes have in common. The number of min-hash values in common between two volumes is an indicator of the degree of similarity between the volumes. This indicator is stored in the storage module 122 as part of the processing data 126. One embodiment of the volume comparison module 314 identifies clusters of volumes that have more than a threshold amount (e.g., 10%) of min-hash values in common. Further, the volume comparison module 314 may discount any min-hash values that match more than a specified amount of the volumes 124 (e.g., that match more than 300 of the approximately 15 million volumes in the corpus) as non-descriptive when evaluating the number of min-hash values the digital volumes 124 have in common. This discounting reduces the impact of common features that appear in many, unrelated volumes.

In one embodiment, the volume comparison module 314 compares each pair of volumes 124 in the corpus using the index. A pair of digital volumes is identified as similar if they share more than a threshold proportion of non-discounted min-hash values. The volume comparison module 314 groups together pairs of similar volumes to form the clusters of volumes that are likely to have common text features.

The page comparison module 316 compares the individual pages of digital text volumes 124 that are clustered together to generate page similarity data and stores these data as part of the processing data 126. The page similarity data indicates the degree of similarity between a pair of compared pages. In one embodiment, the page comparison module 316 performs a page-based comparison for each pair of volumes 124 in a cluster. The page-based comparison compares each page of a volume in the pair with each page of the other volume in the pair, and generates a similarity score for each comparison that reflects the similarity of the two pages being compared. These scores are stored in storage module 122 as processing data 126.

In one embodiment, the page comparison module 316 uses the pages' reduced-dimensionality feature sets (e.g., the min-hash values for the pages) to perform the comparison in a manner similar to the min-hashing approach used by the volume comparison module 314. The page comparison module 316 generates an index for the pages of the volume pair being compared to identify pairs of pages that are similar based on the min-hash values that the pages have in common. The pages are indexed by creating a key for each unique min-hash value produced from the page features. In this manner, the page comparison module 316 associates each min-hash value with one or more pages that have the corresponding min-hash value for the given hash function. The number of min-hash values in common between two pages indicates the similarity score for the two pages. Pairs of pages with a similarity score that exceeds a threshold are identified as matching.

Figure 4:
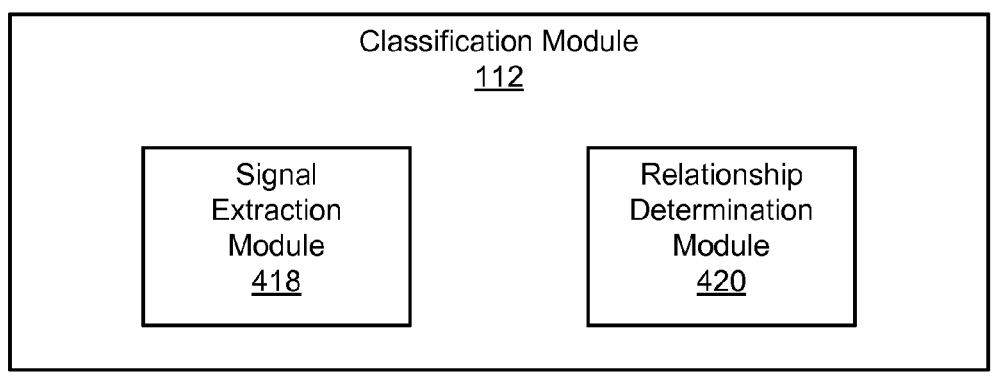
FIG. 4 is a high-level block diagram of a classification module for classifying relationships between volumes, according to one embodiment.

FIG. 4 is a high-level block diagram of the classification module 112 for classifying relationships between volumes 124, according to one embodiment. The classification module 112 includes a signal extraction module 418 and a relationship determination module 420. Other embodiments of the classification module 112 include different and/or additional modules. In addition, the functions may be distributed among the modules in a different manner than described herein.

The signal extraction module 418 uses the stored processing data 126 to extract signals describing the relationships between volumes 124. In general terms, a signal is a collection of one or more metrics derived from the volume and/or page similarity data associated with a pair of volumes. A signal draws out information present in the data in a format that makes one or more relationships between digital volumes 124 more explicit.

In one embodiment, the signal extraction module 418 extracts signals pertaining to each pair of volumes 124 in a cluster from the volume and page similarity data included in the processing data 126. For a given volume pair, the signal extraction module 418 logically treats the volume and page similarity information as separate axes of a graph. One axis represents a measure of volume similarity for the volume pair. In one embodiment, the measure of volume similarity is the number of common min-hash values shared by the volume pair, as described above. The other axis represents a measure of page similarity for the volume pair. In one embodiment, the measure of page similarity is determined from an average of the similarities determined for each pair of pages within the volume pair, as described above.

In one embodiment, the signal extraction module 418 extracts three signals from the processing data 126. The first signal extracted by the signal extraction module 418 is a measure of the relationship between volume similarity and page similarity. The signal extraction module 418 determines page similarity as the average page similarity across matching pages for the two volumes. Thus, this signal provides information about pagination. For instance, if the average page similarity is relatively low while the volume similarity is high, it is likely that volumes contain the same text with different pagination.

The second signal extracted by the signal extraction module 418 is a linear page-to-page fit. In one embodiment, this signal models volume text uniformly distributed across pages with an offset from page zero (i.e., the start of the text) and a multiplier. If the multiplier is close to one, then this indicates that the pagination is likely to be identical. Conversely, if the multiplier is significantly different from one, this suggests different pagination between the two volumes. For example, if for a pair of books, the multiplier is 2 and the offset is 1, this indicates that one book has twice as much text per page as the other, and also has an additional page at the start of the book, such as a forward. A large offset indicates that the one volume may contain a subset of the other. Additionally, the multiplier and offset can be used to predict the page number at which the text of the first volume will end in the second volume. If the second volume ends significantly before or after this page number, this is also an indication that one text includes a subset of the other.

The third signal extracted by the signal extraction module 418 is a relative consecutive page correlation. This signal uses a metric to determine whether two volumes have partially overlapping content from page to page, in a pattern that wraps around periodically over the course of a volume. If a periodic cycle of well-matched and poorly-matched pages is observed, this is an indicator that the two volumes have similar content but different pagination.

In one embodiment, when a pair of pages is determined to be similar, the similarity score for the page in the first volume in the pair and the next page in the second volume of the pair is also considered. If there is no similarity between the page from the first volume and the next page from the second volume, then the consecutive page correlation for the pair of pages is set to zero. Otherwise, the consecutive page correlation is calculated by adding the similarity scores for the page in the first volume and each page in the second volume. This is done for all pairs of pages identified for the pair of volumes, and the resulting individual consecutive page correlation scores are summed to calculate a total consecutive page correlation score for the pair of volumes. Much of the time, this signal will be zero. A non-zero score is a strong indication that the volumes have either the same text but different pagination or contain overlapping text.

Other embodiments of the signal extraction module 418 extract different and/or additional signals than the ones described here. Additionally, signal extraction module 418 may consider further data relating to digital volumes 124 when extracting signals.

The classification module 420 uses the extracted signals to classify the relationship between digital text volumes 124 in a cluster. In some embodiments, the classification module 420 applies a multi-class classifier to the extracted signals for a pair of volumes in a cluster. The multi-class classifier uses a hand-tuned model that incorporates input from multiple sub-classifiers, with each sub-classifier using machine-learning based techniques to calculate the confidence of the volume pair having a specific class based on the extracted signals.

In one embodiment, the multi-class classifier applied by the classification module 420 calculates the confidence of the volume pair having each available class utilizing one or more of the extracted signals. The confidence level is calculated for each class by passing the signals through a series of filters. The filters selectively augment or suppress the relevance of a signal in determining a confidence level for a particular class. For example, for a book to be classified as having the same text and pagination, the volume and page similarities must both be high, and so the volume and page similarity signal is given high importance, whereas other signals are filtered to be of relatively less importance. The classification module 420 picks the class with the highest calculated confidence as describing the relationship between the pair of volumes. In one embodiment, if none of the classes are determined to describe the relationship with at least a threshold confidence level, the classification module 420 does not assign any class for the relationship between the pair of volumes.

In one embodiment, the sub-classifiers are trained using manual intervention and machine learning techniques. A subset of the classifications made by the classification module 420 is reviewed by one or more human users. The human made determination as to whether the automatic classification was correct is fed back to the classification module 420, and the sub-classifiers are updated accordingly. Thus, over time, the determinations made by the classification module 420 become increasingly reliable.

In one embodiment, the classification module 420 classifies a pair of volumes as being in one of four different classes. A "same pagination" class indicates that the pair of volumes has the same text and the same pagination, within a small tolerance to account for discrepancies such as those introduced by scanning and OCR errors. This class is typically identified by both book level and page level comparisons resulting in a high degree of similarity.

A "different pagination" class indicates that the pair of volumes has the same text, but with each volume in the pair being paginated differently. A typical pair of volumes in this class will have a high level of volume level similarity, but a middling to low level of page level similarity. Other indicators, such as a regular alternation between well matched and poorly matched pages may also be used to determine a volume pair contains the same text with different pagination.

A "contiguous subset" class indicates that one volume of the pair contains the text of the other volume with the same pagination. This is identified by a consecutive series of pages having a high degree of similarity across both volumes in the pair. Other indicators that can indicate a volume pair belongs in this class include the linear page-to-page fit signal indicating a large offset, or the presence of additional material following the end of a matching section.

In addition, an "overlapping text" class indicates that the two volumes have large amounts of overlapping text (e.g., many pages with identical text in a row) but that the relationship between the volumes does not fit into one of the other classes. For example, if both books may be collections of short stories and include a common story, but with different pagination. Other embodiments of the classification module 120 classify to different and/or additional classes.

Figure 5:
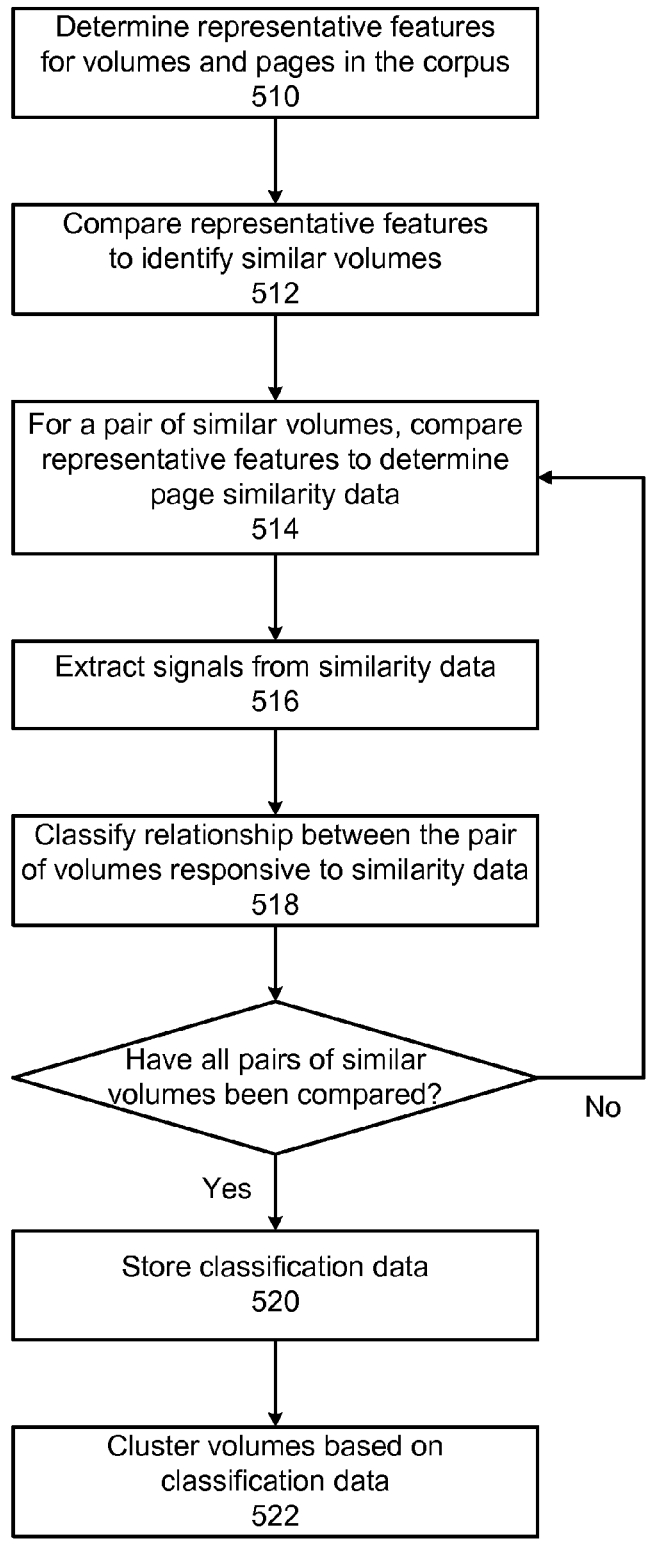
FIG. 5 is a flowchart illustrating a method for identifying and classifying similar volumes in a corpus, according to one embodiment.

FIG. 5 is a flowchart illustrating a method for identifying and classifying similar volumes in a corpus, according to one embodiment. FIG. 5 attributes the steps of the method to the volume processing server 100. However, some or all of the steps may be performed by other entities. In addition, some embodiments may perform the steps in parallel, perform the steps in different orders or perform different steps. The method is described with reference to FIG. 5 as being applied to the whole corpus in a single run. In other embodiments, the method is applied to subsets of the corpus, and/or applied to an individual volume to determine its relationships with other volumes 124 in the corpus at the time it is added to the corpus.

The feature representation module 312 determines representative features for digital volumes 124 in the corpus in step 510. As described above with reference to FIG. 3, this includes representative features of whole volumes as well as representative features of individual pages of those volumes. In one embodiment, the representative features are a set of min-hash values obtained by applying multiple hash functions to 5-word shingles and are stored as part of the processing data 126. Thus, when further volumes are added to the corpus, representative features need only be determined for the newly added volumes. In other embodiments, different and/or further representative features may be used.

In step 512, the volume comparison module 314 compares the representative features of the digital volumes 124 to identify similar volumes. In one embodiment, the digital volumes 124 are sorted into clusters of similar volumes, with any volumes with more than a threshold level of similarity (e.g., sharing more than 10% of associated min-hash values) being included in a cluster. The volume comparison module 314 may include volumes in more than one cluster. For example, a first volume containing a collection of short stories may be included in a "same text, same pagination" cluster as a second volume that contains the same short stories, as well as being included in an "overlapping text" cluster with a third volume that contains a different collection of short stories with one story in common with the first volume. In other embodiments, other similarity criteria may be used. Thus, the comparing identifies one or more clusters of similar books to be further analyzed.

In step 514, the page comparison module 316 compares the representative features for the individual pages of a pair of similar volumes and generates page similarity data for the pair of similar volumes. In one embodiment, the page comparison module 316 selects first and second volumes from a cluster of similar volumes. Each individual page is represented by a set of min-hash values (e.g., 34 per page) and every pairing is compared to determine a level of similarity for that pair of pages, which is then stored as part of the processing data 126. In another embodiment, the page comparison module 316 selects pairs of pages for which the comparison yields a level of similarity above a threshold and records a threshold (e.g., 10%) and stores the level of similarity between those pages as part of the processing data 126. In other embodiments, different page comparison techniques and metrics may be used.

In step 516, the signal extraction module 418 extracts signals from page similarity data for the pair of volumes. In one embodiment, the signals include a measure of the relationship between volume similarity and page similarity, a linear page-to-page fit, and a relative consecutive page correlation; as described above with reference to FIG. 4. In other embodiments, other signals may be used and can be tailored to the extraction of specific relationships of interest within the data relating to a corpus.

In step 518, the relationship determination module 420 classifies the relationship between the first and second volumes. As described above with reference to FIG. 4, in one embodiment, the signals are used by a multi-class classifier to determine which of a plurality of pre-determined classes best describes the relationship between the first and second volumes. In other embodiments, other methods of classification are used.

In the illustrated embodiment, steps 514, 516 and 518 are looped until all pairs of similar volumes that were identified in step 512 have been classified. In some embodiments, classification may include recording an indication that the system could not classify the relationship with a required level of confidence. Once the relationship between all the identified pairs of similar volumes has been classified, the classification module 112 stores the classification data 128 generated in the storage module 122 (step 520). In other embodiments, the classification data 128 may be stored to the storage module 122 "on-the-fly" as it is generated, or by any other method known in the art.

In step 522 of the illustrated embodiment, the classification data are used to determine clusters of volumes with the same or similar relationships. For example, within a set of similar volumes, there may be a first cluster of volumes with identical text and pagination, and a second cluster of volumes that are determined to be different versions of the same book. Volumes are not limited to being in one cluster. In other embodiments, the classification data are processed and stored in other manners. The classification data and clusters may be used for purposes such as improving an electronic publication, selecting a representative version of a digital text volume of a book, identifying anomalous volumes, and detecting piracy.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for automatically correcting errors in digital volumes. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

What is claimed is:

1. A computer-implemented method for identifying relationships between a plurality of digital text volumes in a corpus, the method comprising:
    comparing the plurality of digital text volumes in the corpus to produce volume similarity data describing similarities among pairs of digital text volumes;
    identifying a cluster of similar digital text volumes based on the volume similarity data;
    comparing pages of a pair of digital text volumes within the cluster to determine page similarity data indicating degrees of similarity between the compared pages;
    extracting signals from the volume similarity data and the page similarity data that describe a relationship between the pair of digital text volumes, the extracted signals including at least one of:
        a measure of linear page-to-page fit that models volume text uniformly distributed across pages of the pair of digital text volumes; and
        a measure of relative consecutive page correlation between pages of the pair of digital text volumes;
    classifying the relationship between the pair of digital text volumes based on the extracted signals; and
    storing classification data describing the relationship between the pair of digital text volumes.

2. The method of claim 1, wherein the comparing the plurality of digital text volumes comprises:
    determining a set of representative features for a digital text volume;
    applying a plurality of hash functions to the set of representative features to produce a plurality of hash values for each hash function;
    selecting, for each hash function, a minimum hash value from among the hash values produced by applying that hash function to the set of representative features to produce a reduced feature set containing selected minimum hash values for the digital text volume; and
    comparing the reduced feature set for the digital text volume to reduced feature sets for other digital text volumes to produce the volume similarity data.

3. The method of claim 2, wherein the comparing the reduced feature set for the digital text volume to the reduced feature sets for the other digital text volumes comprises:
    determining a number of minimum hash values in the reduced feature set for the digital text volume that are in common with minimum hash values in a reduced feature set of a second digital text volume in the corpus.

4. The method of claim 1, wherein the comparing pages of the pair of digital text volumes within the cluster to determine the page similarity data comprises:
    determining a set of representative features for a page of a first digital text volume of the pair of digital text volumes;
    applying a plurality of hash functions to the set of representative features to produce a plurality of hash values for each hash function;
    selecting, for each hash function, a minimum hash value from among the hash values produced by applying that hash function to the set of representative features to produce a reduced feature set containing selected minimum hash values for the page; and
    comparing the reduced feature set for the page to the reduced feature sets for pages of a second digital text volume of the pair of digital text volumes to determine the page similarity data.

5. The method of claim 3, wherein the identifying the cluster of the similar digital text volumes comprises:
    clustering the digital text volume and the second digital text volume together in response to the number of minimum hash values in common exceeds a threshold.

6. The method of claim 1, wherein
    the extracted signals further comprise:
    a measure of volume similarity and page similarity between the pair of volumes.

7. The method of claim 1, wherein the classifying the relationship between the pair of digital text volumes based on the extracted signals comprises:
    calculating a confidence level for each of a plurality of classes, the confidence level for a class indicating a likelihood of the relationship being described by that class; and
    assigning a class to the relationship between the pair of digital text volumes responsive to the calculated confidence level.

8. A computer system for identifying relationships between a plurality of digital text volumes in a corpus, the system comprising:
    a non-transitory computer-readable storage medium comprising executable computer program code for:
        comparing the plurality of digital text volumes in the corpus to produce volume similarity data describing similarities among pairs of digital text volumes;
        identifying a cluster of similar digital text volumes based on the volume similarity data;
        comparing pages of a pair of digital text volumes within the cluster to determine page similarity data indicating degrees of similarity between the compared pages;
        extracting signals from the volume similarity data and the page similarity data that describe a relationship between the pair of digital text volumes, the extracted signals including at least one of:

a measure of linear page-to-page fit that models volume text uniformly distributed across pages of the pair of digital text volumes; and a measure of relative consecutive page correlation between pages of the pair of digital text volumes;

classifying the relationship between the pair of digital text volumes based on the extracted signals; and storing classification data describing the relationship between the pair of digital text volumes; and a processor for executing the computer program code.

9. The computer system of claim 8, wherein the comparing the plurality of digital text volumes comprises:

determining a set of representative features for a digital text volume;

applying a plurality of hash functions to the set of representative features to produce a plurality of hash values for each hash function;

selecting, for each hash function, a minimum hash value from among the hash values produced by applying that hash function to the set of representative features to produce a reduced feature set containing selected minimum hash values for the digital text volume; and comparing the reduced feature set for the digital text volume to reduced feature sets for other digital text volumes to produce the volume similarity data.

10. The computer system of claim 9, wherein the comparing the reduced feature set for the digital text volume to the reduced feature sets for the other digital text volumes comprises:

determining a number of minimum hash values in the reduced feature set for the digital text volume that are in common with minimum hash values in a reduced feature set of a second digital text volume in the corpus.

11. The computer system of claim 8, wherein the comparing pages of the pair of digital text volumes within the cluster to determine the page similarity data comprises:

determining a set of representative features for a page of a first digital text volume of the pair of digital text volumes;

applying a plurality of hash functions to the set of representative features to produce a plurality of hash values for each hash function;

selecting, for each hash function, a minimum hash value from among the hash values produced by applying that hash function to the set of representative features to produce a reduced feature set containing selected minimum hash values for the page; and comparing the reduced feature set for the page to the reduced feature sets for pages of a second digital text volume of the pair of digital text volumes to determine the page similarity data.

12. The computer system of claim 10, wherein the identifying the cluster of the similar digital text volumes comprises:

clustering the digital text volume and the second digital text volume together in response to the number of minimum hash values in common exceeds a threshold.

13. The computer system of claim 8, wherein the extracted signals further comprise:

a measure of volume similarity and page similarity between the pair of volumes.

14. The computer system of claim 8, wherein the classifying the relationship between the pair of digital text volumes based on the extracted signals comprises:

calculating a confidence level for each of a plurality of classes, the confidence level for a class indicating a likelihood of the relationship being described by that class; and assigning a class to the relationship between the pair of digital text volumes responsive to the calculated confidence levels.

15. A non-transitory computer-readable storage medium storing executable computer program instructions for identifying relationships between a plurality of digital text volumes in a corpus, the computer program instructions comprising instructions for:

comparing the plurality of digital text volumes in the corpus to produce volume similarity data describing similarities among pairs of digital text volumes;

identifying a cluster of similar digital text volumes based on the volume similarity data;

comparing pages of a pair of digital text volumes within the cluster to determine page similarity data indicating degrees of similarity between the compared pages;

extracting signals from the volume similarity data and the page similarity data that describe a relationship between the pair of digital text volumes, the extracted signals including at least one of:

a measure of linear page-to-page fit that models text uniformly distributed across pages of the pair of digital text volumes and a measure of relative consecutive page correlation between pages of the pair of digital text volumes;

classifying the relationship between the pair of digital text volumes based on the extracted signals; and storing classification data describing the relationship between the pair of digital text volumes.

16. The non-transitory computer-readable storage medium of claim 15, wherein the comparing the plurality of digital text volumes comprises:

determining a set of representative features for a digital text volume;

applying a plurality of hash functions to the set of representative features to produce a plurality of hash values for each hash function;

selecting, for each hash function, a minimum hash value from among the hash values produced by applying that hash function to the set of representative features to produce a reduced feature set containing selected minimum hash values for the digital text volume; and comparing the reduced feature set for the digital text volume to reduced feature sets for other digital text volumes to produce the volume similarity data.

17. The non-transitory computer-readable storage medium of claim 16, wherein the comparing the reduced feature set for the digital text volume to the reduced feature sets for the other digital text volumes comprises:

determining a number of minimum hash values in the reduced feature set for the digital text volume that are in common with minimum hash values in a reduced feature set of a second digital text volume in the corpus.

18. The non-transitory computer-readable storage medium of claim 15, wherein the comparing pages of the pair of digital text volumes within the cluster to determine the page similarity data comprises:

determining a set of representative features for a page of a first digital text volume of the pair of digital text volumes;

applying a plurality of hash functions to the set of representative features to produce a plurality of hash values for each hash function;

selecting, for each hash function, a minimum hash value from among the hash values produced by applying that hash function to the set of representative features to produce a reduced feature set containing selected minimum hash values for the page; and comparing the reduced feature set for the page to the reduced feature sets for pages of a second digital text volume of the pair of digital text volumes to determine the page similarity data.

19. The non-transitory computer-readable storage medium of claim 17, wherein the identifying the cluster of the similar digital text volumes comprises:

clustering the digital text volume and the second digital text volume together in response to the number of minimum hash values in common exceeds a threshold.

20. The non-transitory computer-readable storage medium of claim 15, wherein the classifying the relationship between the pair of digital text volumes based on the extracted signals comprises:

calculating a confidence level for each of a plurality of classes, the confidence level for a class indicating a likelihood of the relationship being described by that class; and assigning a class to the relationship between the pair of digital text volumes responsive to the calculated confidence levels.

* * * * *